(12) United States Patent
Knobloch et al.

(10) Patent No.: US 8,714,260 B2
(45) Date of Patent: May 6, 2014

(54) MULTI-PURPOSE WELL SERVICING APPARATUS

(75) Inventors: Benton Knobloch, Broussard, LA (US);
Todd Roy, Youngsville, LA (US);
Stephen R. Callegari, Sr., Maurice, LA (US); Iris T. Callegari, legal representative, Maurice, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/525,686

(22) Filed: Jun. 18, 2012

(65) Prior Publication Data

US 2013/0153245 A1 Jun. 20, 2013

Related U.S. Application Data

(63) Continuation of application No. 12/663,359, filed as application No. PCT/US2008/069276 on Jul. 6, 2008, now abandoned.

(60) Provisional application No. 60/958,507, filed on Jul. 6, 2007.

(51) Int. Cl.
*E21B 37/02* (2006.01)
*E21B 17/10* (2006.01)

(52) U.S. Cl.
USPC ...... 166/311; 166/173; 166/241.6; 175/325.7

(58) Field of Classification Search
USPC ............ 166/170, 173, 311, 241.6; 175/325.6, 175/325.5, 325.7
See application file for complete search history.

(56) References Cited

U.S. PATENT DOCUMENTS

| 1,756,195 | A | * | 4/1930 | Holdaway | 175/325.3 |
|---|---|---|---|---|---|
| 2,836,251 | A | * | 5/1958 | Claypool et al. | 166/173 |
| 3,637,033 | A | * | 1/1972 | Mayall | 175/320 |
| 4,082,373 | A | * | 4/1978 | Kellner | 175/325.3 |
| 5,901,798 | A | * | 5/1999 | Herrera et al. | 175/325.3 |
| 6,152,220 | A | * | 11/2000 | Carmichael et al. | 166/173 |
| 6,464,010 | B1 | * | 10/2002 | Brown | 166/311 |
| 6,530,429 | B2 | * | 3/2003 | Howlett | 166/173 |
| 6,546,581 | B1 | * | 4/2003 | Swietlik et al. | 15/104.16 |
| 6,655,462 | B1 | * | 12/2003 | Carmichael et al. | 166/311 |
| 6,951,251 | B2 | * | 10/2005 | Penisson | 166/312 |
| 7,096,950 | B2 | * | 8/2006 | Howlett et al. | 166/298 |
| 7,137,449 | B2 | * | 11/2006 | Silguero | 166/301 |
| 7,143,829 | B2 | * | 12/2006 | Booth | 166/311 |
| 7,255,164 | B2 | * | 8/2007 | Tulloch et al. | 166/173 |
| 7,311,141 | B2 | * | 12/2007 | Tulloch et al. | 166/173 |
| 7,513,299 | B2 | * | 4/2009 | Ruttley | 166/66.5 |
| 8,220,532 | B2 | * | 7/2012 | Hagen | 166/66.5 |
| 8,336,626 | B2 | * | 12/2012 | Hern et al. | 166/311 |

(Continued)

OTHER PUBLICATIONS

"Mount", http://www.thefreedictionary.com/mount, downloaded Jul. 3, 2013.*

(Continued)

*Primary Examiner* — Jennifer H Gay
(74) *Attorney, Agent, or Firm* — Booth Albanesi Schroeder LLC

(57) ABSTRACT

An apparatus for cleaning the inner wall of wellbores and for capturing downhole wellbore debris. An elongated, tubular central mandrel is provided with recesses on its outer surface. Various service elements are interchangeably mounted over the split rings. The various service elements include stabilizers, brush assemblies, junk baskets and magnets.

25 Claims, 6 Drawing Sheets

(56) References Cited

U.S. PATENT DOCUMENTS

| | | |
|---|---|---|
| 2002/0129976 A1 | 9/2002 | Rastegar |
| 2004/0168806 A1* | 9/2004 | Booth .......................... 166/311 |
| 2007/0068670 A1* | 3/2007 | Booth .......................... 166/173 |
| 2010/0181064 A1* | 7/2010 | Knobloch et al. .............. 166/99 |
| 2011/0265988 A1* | 11/2011 | Hern et al. .................... 166/173 |

OTHER PUBLICATIONS

*M-I, LLC* v. *Chad Lee Stelly, et al.*, In the United States District Court for the Southern District of Texas, Houston Division, C.A. No. 4:09-CV-01552, Third Amended Complaint (Exhibits A-G were designated Attorney Eyes Only at time of filing and have been removed), Sep. 7, 2010.

*M-I, LLC* v. *Chad Lee Stelly, et al.*, In the United States District Court for the Southern District of Texas, Houston Division, C.A. No. 4:09-CV-01552, Answer and Counterclaims to Plaintiff's Third Amended Complaint, Jan. 28, 2011.

*M-I, LLC* v. *Chad Lee Stelly, et al.*, In the United States District Court for the Southern District of Texas, Houston Division, C.A. No. 4:09-CV-01552, Order of Dismissal with Prejudice, Jun. 28, 2012.

* cited by examiner

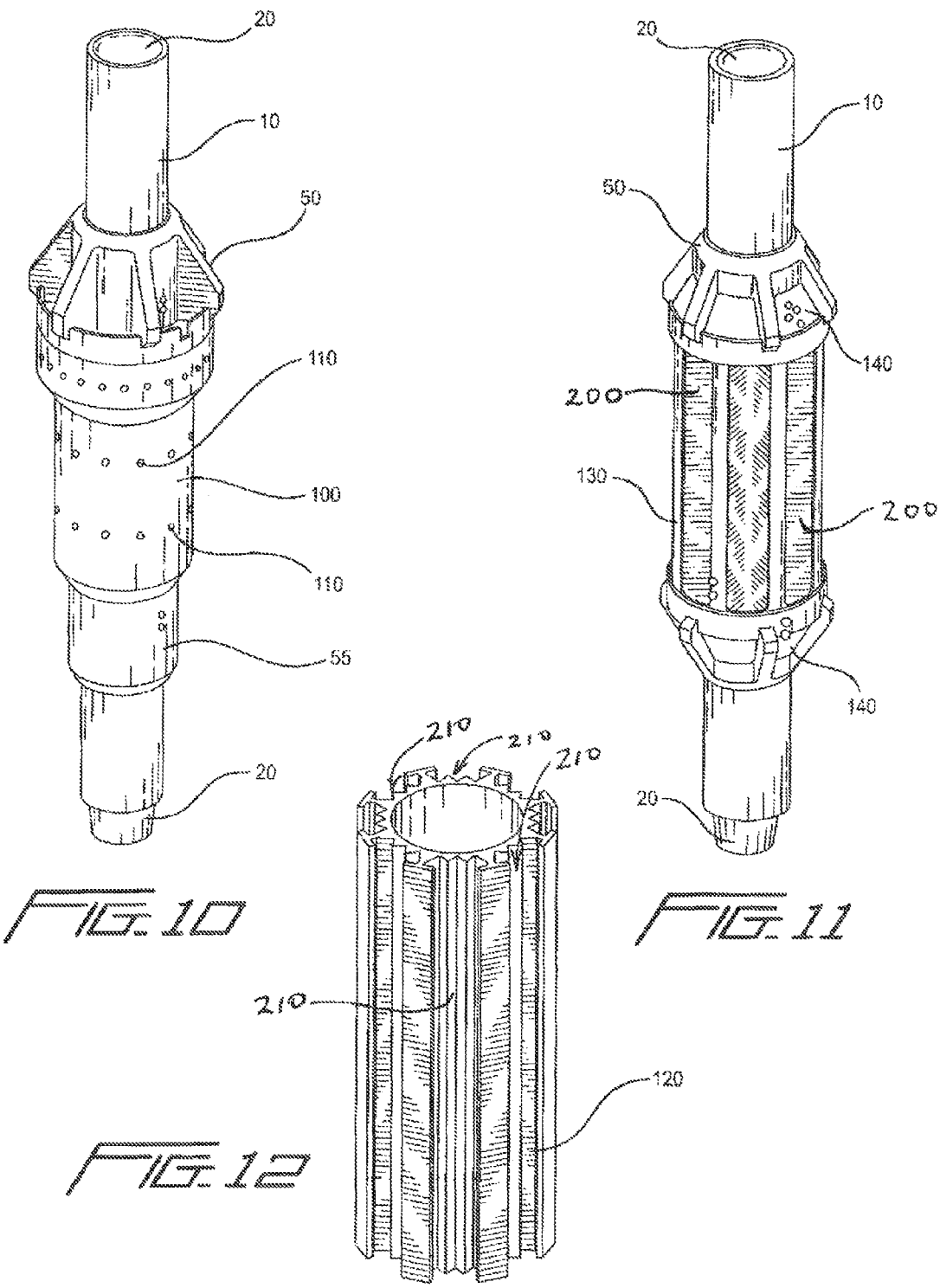

MULTI-PURPOSE WELL SERVICING APPARATUS

CROSS REFERENCE TO RELATED APPLICATIONS

This patent application is a Continuation of Ser. No. 12/663,359 filed Dec. 7, 2009 (now abandoned) which is a Nation Stage application of PCT/US08/69276 filed Jul. 6, 2008 which claims benifit of U.S. provisional patent application Ser. No. 60/958,507, filed Jul. 6, 2007, for all purposes.

BACKGROUND

1. Field of the Invention

This invention relates to tools used in the drilling and servicing of oil and gas wells, referred to hereinafter as "wells." More particularly, this invention generally relates to a downhole (that is, to be run from the surface down into a well) tool comprising interchangeable service components, which are retained on the outer diameter of a central mandrel. The invention can be used to clean the inner walls of casing, risers (e.g. on a floating drilling rig), or any like surfaces, or to collect solid contaminants generally present in these sections either on inner walls, or within the wellbore fluid itself. The interchangeable components are interchangeable in various configurations, and mounted on the mandrel so as to be either rotational or non-rotational with respect to the mandrel. It is to be understood that "well servicing apparatus" refers to apparatus to service not only the physical structure of the well (or "wellbore") (namely, the casing string forming the wellbore, a riser associated with a floating rig, or any other downhole tubular), but also the fluids contained within the wellbore.

2. Related Art

While the present invention can be used in a variety of applications, for exemplary purposes the invention will be described in connection with the cleaning of casing or riser walls after a well has been drilled and a clear completion fluid is put into the well. It is after a well has been drilled and a clear completion fluid is put into the well. It is understood that the present invention can be used to clean any sort of downhole tubular, including risers, BOP stacks, casing strings, etc.

Oil and gas wells are usually drilled with a solids-laden fluid in the borehole, said fluid commonly referred to as drilling "mud." Mud provides several essential purposes, including control of formation pressure, cooling of the drill-bit, removal of drill cuttings from the borehole, etc.

However, after the well is drilled and production casing is run, in many well completion scenarios (for example, gravel packed completions), the drilling mud must be displaced from the wellbore and a clear (that is, solids-free) fluid, known as a completion fluid or completion brine, circulated into the wellbore. The use of solids-free completion fluids is necessary in order to gravel pack the completion interval. However, even though the completion fluid (when put into the wellbore) is substantially free of solids, it can be appreciated that the wellbore tends to retain a quantity of drilling mud and other solids on the inner wall of the casing or riser. In addition to simply circulating the completion fluid into and out of the wellbore, it is usually necessary to mechanically remove the layer of mud, usually by scraping with some downhole tool. Also, it is common that pieces of ferrous and non-ferrous "junk" remain in the wellbore, which must preferably be removed.

Over the years, a number of tools have been developed for this task, for example casing scrapers and brushes for cleaning the tubular (whether it be casing, a riser, etc.) wall; junk baskets for removing certain undesired objects from the wellbore; and downhole magnets for removing ferrous objects. Traditionally, each of such tools are separate, dedicated tools (that is, separate casing scrapers/brushes, junk baskets, and magnets), with little or no common structural elements. As a result, the known prior art tools have certain limitations, including high cost, difficulty in changing scraper blades/brushes, etc.

It is desired to have a downhole well servicing apparatus which provides a central carrier or mandrel to which can be easily and removably mounted a variety of well service components, including brushes, junk baskets, and magnets, in addition to stabilizer elements to mount the other various servicing tools in proper position on the central mandrel. It is further desired to have an apparatus comprising certain removable and replaceable elements which minimize wear on the central mandrel, which is generally the most expensive component of the apparatus.

BRIEF DESCRIPTION OF THE DRAWINGS

FIG. 1A is a longitudinal view in cross section of one embodiment of the apparatus.

FIG. 1B is a cross-sectional view of the ball mounting taken along line 1B-1B in FIG. 1A.

FIG. 10 is an assembled view, in perspective, of the junk basket embodiment.

FIG. 11 is an assembled view of the borehole magnet embodiment of the invention.

FIGS. 12-14 are views of the outer sleeve magnet carrier and other components of the borehole magnet embodiment of the apparatus.

DETAILED DESCRIPTION OF THE PREFERRED EMBODIMENTS OF THE INVENTION

Various embodiments of the present invention comprise enhanced and improved downhole tool assemblies, for cleaning the internal wall of tubulars (casing, risers, etc.) and the collection of the material being cleaned. Generally, a downhole tool comprising the present invention is connected to a string of drill pipe, work string, tubing, or the like, referred to collectively as a "drill string," to be run into a wellbore tubular, and used in the servicing of oil and gas wells. For this application, the term "wellbore" includes without limitation any downhole tubular, whether a casing string, a riser associated with a floating drilling rig or any other type rig, or any other tubular member. In an exemplary embodiment, the apparatus of the present invention comprises two primary elements:

1) a central mandrel, typically connected by a threaded connection to a drill string, comprising an outer diameter profile (such as under-cut profiles or other outer diameter variations) which allows well servicing devices to be slid over the outside of the mandrel and retained or locked in position; and 2) one or more of a plurality of service components which attach to the mandrel. In current embodiments, all of said service components are longitudinally fixed on the mandrel (that is, can move neither up nor down along the mandrel), but may be either rotationally fixed on the mandrel, or attached so as to permit rotation with respect to the mandrel.

With reference to the drawings, various embodiments of the apparatus of the present invention can be described.

The Mandrel and Split Rings

Figure 1:
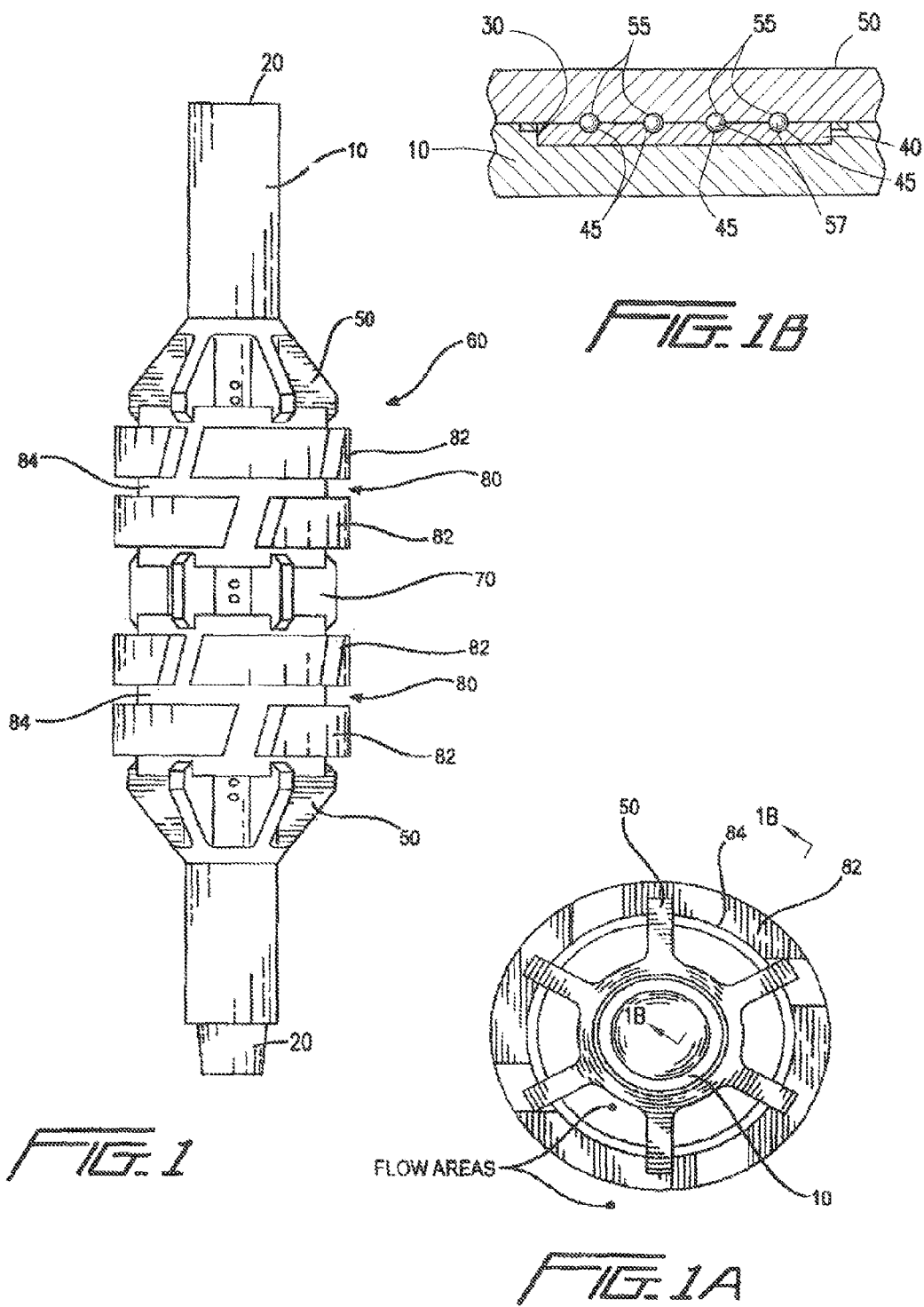
FIG. 1 is a side view of one embodiment of the present invention, comprising brush type sleeve components, to illustrate one overall view of the apparatus.
Figure 2:
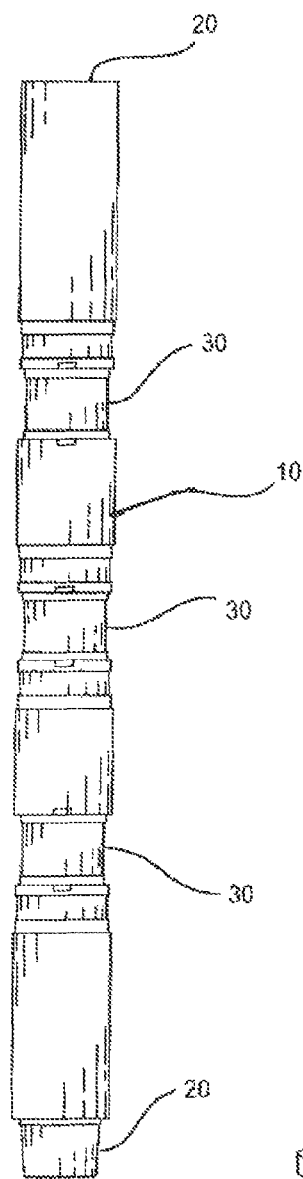
FIG. 2 is a side view of the mandrel.

As will be appreciated from the following description, the mandrel and split rings, in a sense, form the foundation of the well servicing apparatus, to which can be mounted various service components. Same can be described by reference to one of the presently preferred embodiments. FIG. 1 is an assembled view of the brush embodiment of the invention, which illustrates an assembled view of one embodiment, to assist in explanation of the various components. Referring to FIG. 2, mandrel 10 is an elongated tubular member with a longitudinal bore. Mandrel 10 typically comprises upper and lower threaded connectors 20, for attachment to a drillstring. It can be readily seen that mandrel 10 comprises an outer profile with a plurality of recesses 30, into which other elements of the invention fit, as further described. Mandrel 10 is typically made of high strength steel, as is well known in the relevant art.

Figure 3:
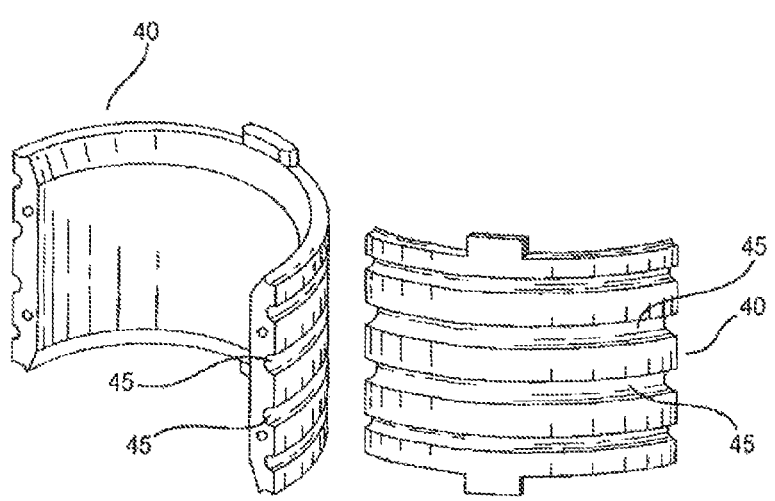
FIG. 3 is a perspective view of split rings, which mount on the mandrel.

Split rings 40, as seen in FIG. 3, fit around mandrel 10 and into recesses 30, and are then bolted in place. Split rings 40 may comprise one or more bearing races 45, which completely encircle mandrel 10 once assembled, and into which ball bearings may be placed to permit easy rotation of other components around the split rings. It is understood that recesses 30 and the inner profile of split rings 40 have mating, rotationally interfering surfaces which prevent split rings 40 from rotating on mandrel 10.

Figure 4:
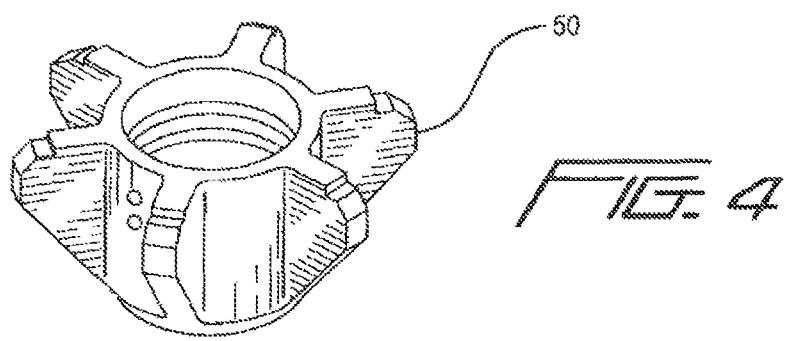
FIG. 4 is a perspective view of a stabilizer element.

FIG. 4 shows an end stabilizer element 50 with interior ball bearing races 55. End stabilizer element 50 is preferably used on either end of a brush assembly or other service device (as later described in more detail), and has a tapering profile. As illustrated in FIG. 4A, end stabilizer element 50 slides over mandrel 10 and over split ring 40 (when split ring 40 is mounted on mandrel 10), and is there fixed in place by means known in the art, including placement of balls 57 through openings 58 in stabilizer elements and into bearing races 45 and 55, which by interference prevent end stabilizer elements 50 from moving longitudinally on mandrel 10. Alternatively, where end stabilizer element 50 is attached in a non-rotating configuration, same can be fixed to split ring 40 by bolting or other means known in the relevant art.

The mandrel, split rings, and stabilizer elements form a structural foundation for mounting various service devices to form the various embodiments of the apparatus, which can now be described.

Brush Tool

As can be seen in FIG. 1, one embodiment of the present invention comprises a brush assembly as a service component. This embodiment comprises brush elements (with outer radiating bristles), particularly suitable for cleaning the inner wall of a tubular, such as a casing string, tubing string, drilling riser, and the like.

Figure 5:
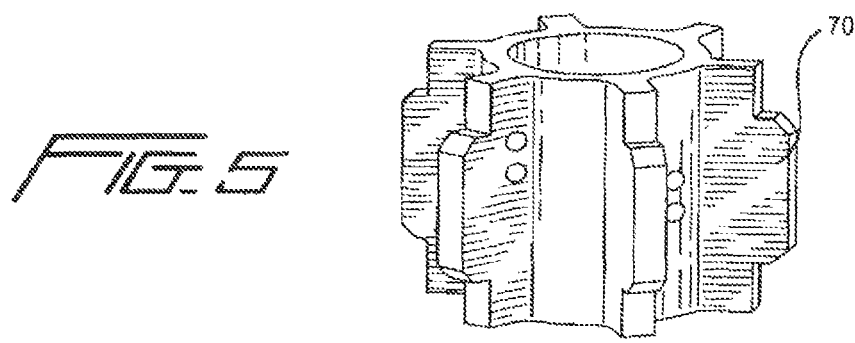
FIG. 5 is a perspective view of another stabilizer element.
Figure 6:
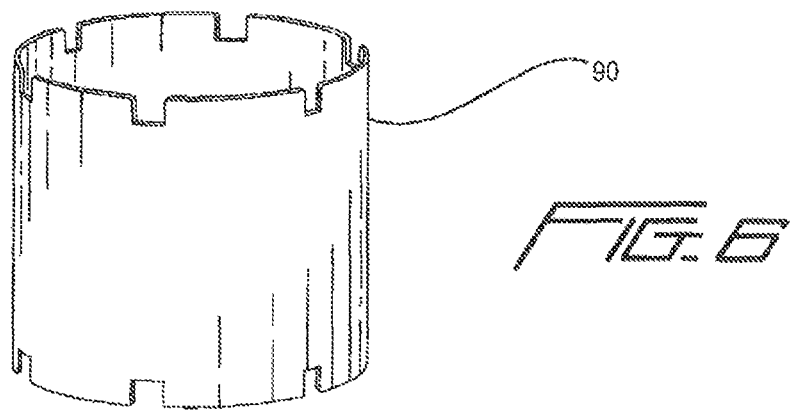
FIG. 6 is a perspective view of the under carrier for the brush assembly.

The brush tool 60 comprises mandrel 10, split rings 40 mounted in the recesses thereof (not visible in FIG. 1), end stabilizer elements 50, and in the embodiment shown an intermediate stabilizer element 70 (shown in detail in FIG. 5). Intermediate stabilizer element 70 is mounted on mandrel 10, over a split ring 40, in the same manner as the mounting of end stabilizer element 50 as described above. It is understood that depending upon the particular configuration desired, brush tool 60 may comprise only end stabilizer elements (that is, no intermediate stabilizer element). In this embodiment, the service component comprises one or more brush assemblies 80, comprising brush outer carriers 84, shown in detail in FIG. 7, mounted on mandrel 10 and held in place by stabilizer elements, for example end stabilizer elements 50, fitting into mating notches, as can be seen. Brush under carriers 90, shown in detail in FIG. 6, are fitted under brush outer carriers 84. Assembly of the brush tool is by the split rings first being mounted on mandrel 10; then one of the end stabilizer elements 50 mounted thereon; then brush under carrier 90 and brush assembly 80 is slid over and fitted to end stabilizer element 50; if desired, an intermediate stabilizer element 70 is slid on; another pair of brush under carrier 90 and brush assembly 80 is slid over and fitted to intermediate stabilizer element 70; and finally the last end stabilizer element 50 is mounted. It can be readily appreciated that the overall assembly is therefore "stacked on" the mandrel, and longitudinally locked in place by the end (and, where used, intermediate) stabilizer members. As previously stated, the apparatus may use only end stabilizer elements.

Figure 7:
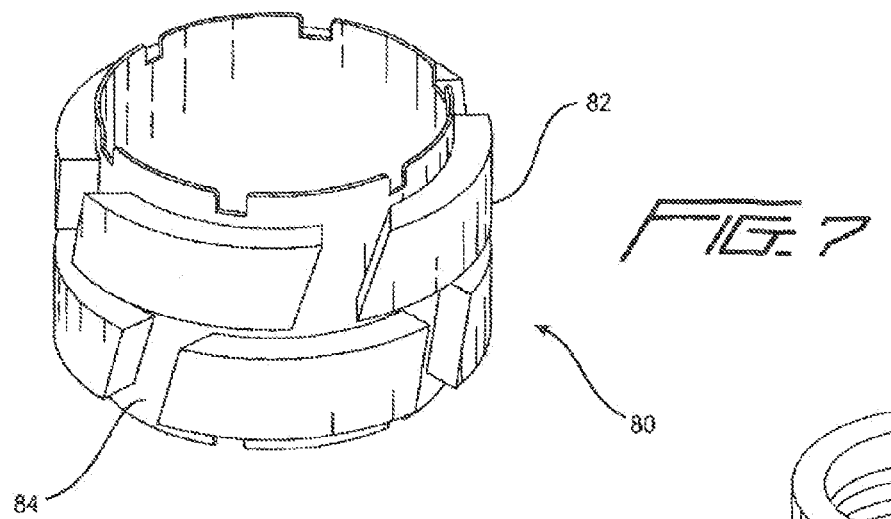
FIG. 7 is a perspective view of the brush assembly.

As seen in FIG. 7, brush assemblies 80 comprise brush outer carriers 84 and the actual brushes 82, which may comprise wire, polymer, brass, Kevlar, or material filaments, secured to a outer carrier 84. Outer carrier 84 may be of thin metal or other material, such as carbon fiber, kevlar, etc. As described above, brush assembly 80, including outer carrier 84, slides over brush under carrier 90. The present design therefore allows fluid flow around the outer diameter of brush outer carrier 84, or between brush under carrier 90 and mandrel 10 (FIG. 2) where it is locked between stabilizer elements (50 and/or 70). FIG. 1A illustrates possible fluid flow areas. In a presently preferred embodiment, outer carrier 84 is of relatively thin material, such as sheet metal or other suitable material, and may be disposable. In such embodiment, brush under carrier 90 provides additional structural support for the brush outer carrier 84. In other embodiments, outer carrier 84 can be made sufficiently strong to eliminate the need for brush under carrier 90.

It is understood that the dimensions and shape of brushes 82 may be configured so as to clean tubular (e.g. casing or riser) walls, or other profiles, such as a wellhead brush designed and profiled to effectively brush, polish, and clean a wellhead area. The brush outer carrier may comprise a spiral wound wire brush strut wrapped around and secured to a base outer carrier. This outer carrier will be slid over the under carrier. Both carriers will be secured to the stabilizer elements. The spiral wound wire forming the brushes will be twisted and crimped for optimal wire performance. The brush assemblies can be stacked and locked in place to form a brush cleaning surface composed of two or more primary brush sections. The brush dimension (length) is so as to form an interference fit with the inner diameter of the tubular within which the apparatus is run; this ensures that the brush will be kept in contact with the casing or riser wall with a continuous force. This brush dimension and proper standoff will ensure the various inner diameter ranges are effectively covered and cleaned in vertical and deviated wellbores, while the tool is being run into the hole or being pulled out of the hole.

It is to be understood that the end and intermediate stabilizer elements may be mounted so as to be rotatable around mandrel 10 (or more particularly, around split rings 40), and ball bearings, beryllium copper or the like may be inserted through holes in the stabilizer elements, into the bearing races formed in the outer surfaces of split rings 40 and the inner surfaces of the stabilizer elements. With such arrangement, end and intermediate stabilizer elements are longitudinally fixed with respect to mandrel 10, by virtue of interference between the ball races in split rings 40, the ball bearings, and corresponding races in the interior of the end and intermediate stabilizer elements 50 and 70. If desired, however, the stabilizer elements may be mounted in a rotationally fixed position on split rings 40, thereby rotating along with mandrel 10.

It can be readily appreciated that split rings 40 effectively shield mandrel 10 and minimize or eliminate any wear to mandrel 10 which might otherwise occur due to rotation of the stabilizer elements with respect to the mandrel. The split rings are relatively inexpensive (compared to the cost of the mandrel), and readily changed, so as to greatly extend mandrel life and thereby reduce costs.

To use the brush tool embodiment of the present invention, the apparatus is made up in a tubular string, as known in the art. The diameter of brushes 82 is selected so as to provide contact with substantially the entirety of the circumference of the tubular (wellbore, riser, etc.) within which it is being run. The apparatus is then lowered into the wellbore to a desired depth. The tubular string is then moved as desired—reciprocation and/or rotation—while fluid circulation is maintained. It is readily appreciated that brushes 82 brush and abrade the wall of the wellbore (casing, riser, etc.) within which the tool is run, thereby dislodging solids such as mud cake and the like. Depending upon whether brushes 82 are mounted to mandrel 10 in a rotating or non-rotating manner (as described above), brushes 82 will either rotate along with the tubular string or remain rotationally stationary, while the tubular string rotates within.

Junk Basket

The term "junk basket" is one in long use in the oil and gas well drilling and servicing industry. Broadly, the term refers to a tool which is run downhole in a wellbore, which has a receptacle into which "junk" or debris (for example, pieces of metal broken or worn off of downhole tools) can be caught and thereby removed from the well. Such debris is moved into the receptacle by fluid flow; usually, the design of the junk basket provides a vortex velocity which promotes larger solids to fall out of the fluid stream or suspension and into the receptacle collection chamber.

The junk basket embodiment of this invention, similar to the brush tool, comprises service components secured onto the mandrel (the same mandrel as may be used for the brush tool). The interchangeability of the mandrel, that is, the ability to "dress" the mandrel with different tools for different applications, is an advantage of this invention for the user.

Figure 8:
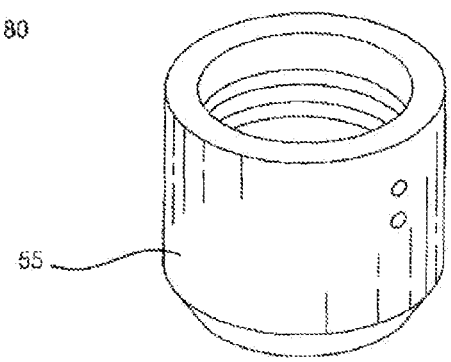
FIGS. 8 and 9 show the lower stabilizer and outer junk basket elements, comprising parts of the junk basket embodiment of the apparatus.
Figure 9:
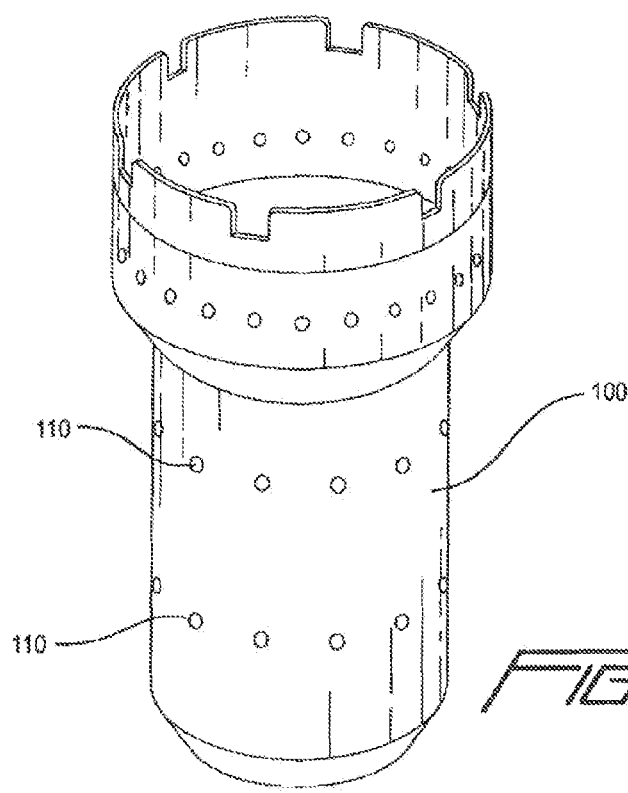

Referring to FIGS. 8-10: the junk basket embodiment is assembled by sliding a lower stabilizer element 55 onto mandrel 10, and securing same in place on a split ring 40 in either a rotationally locked or unlocked position, as desired. Note that if split ring 40 is mounted in a rotationally unlocked manner, balls are inserted into races in split ring 45 (said balls also fitting into corresponding races in the interior wall of lower stabilizer element 55). Next, referring to FIGS. 9 and 10 (an assembled view of the junk basket embodiment), a service component comprising an outer junk basket carrier 100, preferably having a tapered profile at its lower end, is slid over mandrel 10, to rest against lower stabilizer element 55. An end stabilizer element 50, as in FIG. 4, is then slid onto mandrel 10, to rest against outer junk basket carrier 100. End stabilizer element 50 is then secured on split ring 40, as previously described. In this way outer junk basket carrier 100 is thereby secured between lower stabilizer element 55 and end stabilizer element 50. In use, fluid is pumped downhole through the tubular string on which the apparatus is run, and flows up the annulus between outer junk basket carrier 100 and the inner wall of the tubular within which the junk basket is run. A cavity is formed between outer junk basket carrier 100 and mandrel 10, into which debris tends to be deposited. As can be seen in FIGS. 9 and 10, a plurality of ports 110, preferably angled, in outer junk basket carrier 100 permit additional vortex currents to develop, further promoting the deposition of debris within the carrier, and in addition serve as drain ports when the tool is retrieved. As circulation around the outer diameter of the bucket occurs, a vortex effect is created, thus pulling fluid through the ports and dumping debris in the upper open end of the outer junk basket carrier.

To use the junk basket embodiment of the present invention: a size (namely, outer diameter) of junk basket carrier 100 is selected that yields a suitable annulus between junk basket carrier 100 and the inner wall of the tubular (typically casing or riser) within which it is run. By way of example only, said annulus may be selected to be on the order of one to two inches. The apparatus is then lowered into the wellbore to a desired depth. Then, fluid circulation down the tubular string and back up the annulus between the tubular string/junk basket and casing string tends to carry solids uphole. As is well known in the relevant art field, as solids are carried up the annulus to the junk basket carrier, the sudden enlargement of annular flow area as the fluid flows past the junk basket results in a decrease in annular velocity, with the result that the solids tend to fall out of the fluid stream and are induced into the cavity. The junk basket can be reciprocated and/or rotated as desired. After the desired period of circulation downhole, the tubular string along with the junk basket is retrieved to the surface, where the tool can be disassembled and any captured debris removed from the cavity.

Magnet Tool

Yet another embodiment of the present invention is a downhole magnet. Magnets have long been used in the drilling and servicing of wellbores to attract and hold ferrous materials, for retrieval from a borehole. Magnets may be used to retrieve small pieces of debris, or even shavings.

Figure 13:
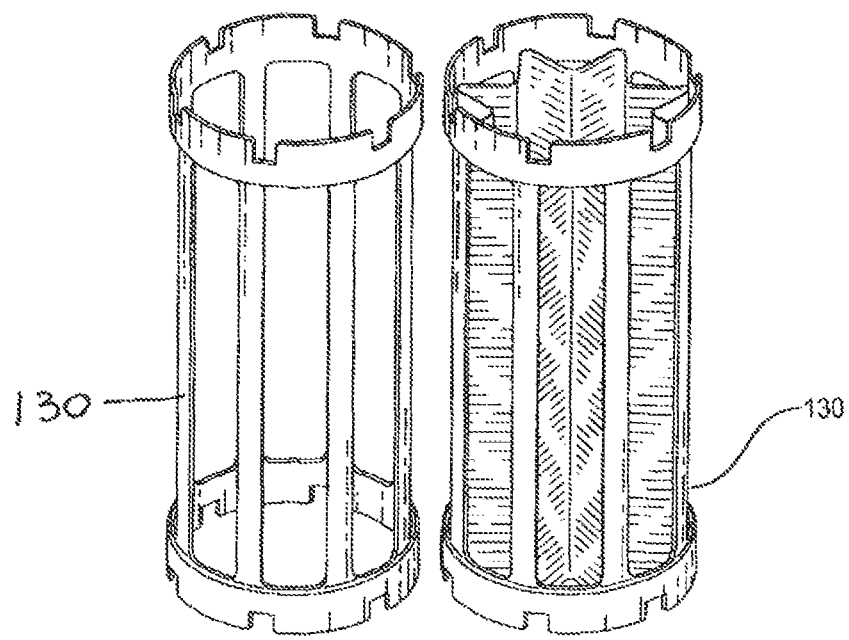
Figure 14:
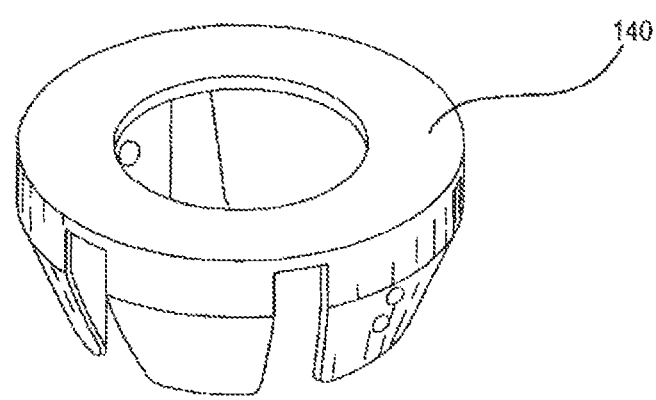

FIG. 11 shows an overall view of one embodiment of the magnet. As in the other embodiments of the present invention, mandrel 10 and stabilizer elements 50 (and, if appropriate, 70) form a foundation for the remainder of the tool. A service component comprising magnets and a carrier therefore is attached to the stabilizer elements. A carrier 120, preferably made of aluminum, shown separately and dismounted from mandrel 10 in FIG. 12, is slid over mandrel 10, and magnets 200 are secured in the longitudinal pockets 210 therein. Preferably, the magnets are positioned so as to cover a majority of the circumference of the outer diameter of carrier 120. In the embodiment shown, the magnets will be positioned in carrier 120 and secured with "V" groove outer slot sleeves (preferably of stainless steel) and outer sleeve or shroud 130 (also preferably of stainless steel), shown in FIG. 13. These outer slot sleeves and shroud unit will be locked between the stabilizer elements, along with support housings 140, FIG. 14. FIG. 11 shows the overall arrangement of the magnet tool, which has an assembly easily understood in view of the foregoing description. It is understood, however, that various changes could be made to the specific shape and geometry of the carrier (including non-V groove shapes). In addition, outer sleeve or shroud may take the form of a solid cylindrical tube.

Use of the magnet tool embodiment of the present invention is by making the magnet up into the tubular string, then lowering the tool into the wellbore to a desired depth. Fluid circulation (with or without movement of the magnet, either reciprocation or rotation) past the magnet causes any ferrous materials to be carried by the magnet, where they can be caught by the magnet, as is known in the relevant art. Upon retrieval of the magnet from the borehole, any ferrous objects clinging thereto can be removed.

Other Embodiments

The structure of the present tool lends itself to still other embodiments, for example stabilizers/centralizers which utilize various of the elements of the tool (e.g. mandrel 10), yet add additional elements such as stabilizer members, etc.

Various embodiments of the present invention generally provide for enhanced tubular cleaning by at least one of the specified carrier designs providing superior casing coverage, engagement, contact or collection. The integral mandrel is designed to provide enlarged internal bore diameters and improved specifications with regard to usage and material ratings. The mandrel allows for interchangeable and adaptable construction of the various other components, with improved retention design and reduction of tool failure.

Downhole tools of the present invention are capable of cleaning an internal surface of a casing or tubular string. In addition, various modifications can be made to adapt tool embodiments to the cleaning or removal of varying wellbore/casing situations, including but not limited to accumulations of cement, downhole isolation and cleaning plugs, downhole collars, float equipment, casing scale, casing film, casing hydrate, accumulations of substrate, pieces of drill string, and/or the like. Profiles which can be cleaned include but are not limited to drilling profiles, milling profiles, slick profiles, tapered profiles, stabilizing profiles and/or the like.

Various other embodiments of the present invention generally comprise methods for brushing and/or cleaning a surface of casings, wellheads, BOP's, tubulars or other material of the like; methods of constructing an adaptable brushing, cleaning or collecting tool as herein described; and/or the like.

It is to be understood that the different embodiments of the present invention can be used in combination in a single tubular string. For example, any combination of brush tool, junk basket, and magnet can be made up in a given tubular string and run downhole at the same time. Such combination use may permit not only the wall of the casing string to be cleaned, but also capture of debris in the junk basket and capture of ferrous materials on the magnet. This may yield the most efficient use of the various tools.

These and other features and advantages of the invention will be apparent to those skilled in the art from the preceding description of the preferred embodiments.

Summary

While the preceding description sets out specifics regarding one embodiment of the invention, it is understood that other embodiments are possible without departing from the scope of the invention. Various changes in specific embodiments can be made without departing from the spirit and scope of the invention. For example, various materials can be used to make the tool. Dimensions can be modified to suit different applications.

Therefore, the scope of the invention is not limited to the specific embodiment(s) set out herein, but is defined by the appended claims and their legal equivalents.

We claim:

1. An improved well service tool, having an elongated, central hollow mandrel with threaded connections on either end, first and second axially spaced circumferential recesses formed in the exterior surface of the mandrel; split rings, removably mounted around the mandrel in the recesses; a stabilizer element mounted over the exterior of each split ring; and a cylindrical service element, removably disposed around the central mandrel between the stabilizer elements, and wherein the improvement comprises a third circumferential recess in the exterior surface of the mandrel, the third recess positioned axially between the first and second recess, a third split ring, removably mounted around the mandrel in the recess; a third stabilizer element mounted over the exterior of the third split ring service element, removably disposed around the central mandrel and position between the adjacent stabilizers.

2. The well service tool of claim 1, wherein the split rings comprise an outer circumferential ball race, the stabilizer elements comprise a mating inner circumferential ball race, and further comprising a plurality of balls disposed in the mating ball races, whereby the stabilizer elements are rotatable with respect to the central mandrel.

3. The well service tool of claim 1, wherein the service elements comprise brushes.

4. The well service tool of claim 3, wherein the split rings comprise an outer circumferential ball race, the stabilizer elements comprise a mating inner circumferential ball race, and additionally comprising a plurality of balls disposed in the mating ball races, whereby the stabilizer elements are rotatable with respect to the central mandrel.

5. The well service tool of claim 1, wherein the service element comprises a junk basket.

6. The well service tool of claim 5, wherein the split rings comprise an outer circumferential ball race, the stabilizer elements comprise a mating inner circumferential ball race, and additionally comprising a plurality of balls disposed in the mating ball races, whereby the stabilizer elements are rotatable with respect to the central mandrel.

7. The well service tool of claim 1, wherein the service element comprises a magnet.

8. The well service tool of claim 7, wherein the split rings comprise an outer circumferential ball race, the stabilizer elements comprise a mating inner circumferential ball race, and additionally comprising a plurality of balls disposed in the mating bail races, whereby the stabilizer elements are rotatable with respect to the central mandrel.

9. The well service tool of claim 1, wherein each split ring comprises two semi-cylindrical sections.

10. The well servicing tool of claim 9, wherein the inner profile of the split rings have mating, rotationally interfering surfaces which prevent split rings from rotating on the mandrel.

11. The well service tool of claim 1, wherein the service elements comprises wellbore contacting elements.

12. The well service tool of claim 1, wherein each of the circumferential recesses comprises an annular groove in the exterior surface of the mandrel.

13. The well service tool of claim 1, wherein the axial position of the third recess is substantially centered between the first and second recesses.

14. A method of servicing a wellbore at a subterranean location, comprising the steps of:

providing a well servicing tool, configured to comprise an elongated, central hollow mandrel with threaded connections on either end, an intermediate circumferential recesses formed in the exterior surface of the mandrel between two axially spaced circumferential recesses formed in the exterior surface of the mandrel; split rings, removably mounted an the mandrel in the recesses; stabilizer elements, removably mounted over the exterior of each split ring; and cylindrical-shaped first and second service elements, removably mounted on the central mandrel between the adjacent stabilizer elements, and wherein the method comprises:

moving the well servicing tool into and out of the wellbore to service the wellbore;

thereafter reconfiguring the servicing tool, the reconfiguration comprising removing from the mandrel the stabilizer element mounted over the split ring in the intermediate recess and removing from the mandrel the first and second service elements; without reinstalling the stabilizer at the intermediate recess, removably installing a third cylindrical service element on the central mandrel positioned between the two remaining stabilizer elements; and moving the reconfigured well servicing tool into and out of the wellbore to service the wellbore.

15. The wellbore servicing method of claim 14, wherein each of the circumferential recesses comprises an annular groove in the exterior surface of the mandrel.

16. The well servicing method of claim 15, wherein each split ring comprises two semi-cylindrical sections.

17. The wellbore servicing method of claim 16, wherein the split rings comprise an outer circumferential bail race, the stabilizer elements comprise a mating inner circumferential ball race, and additionally comprising a plurality of balls disposed in the mating ball races, whereby the stabilizer elements are rotatable with respect to the central mandrel.

18. The wellbore servicing method of claim 14, wherein the inner profile of the split rings have mating, rotationally interfering surfaces which prevent split rings from rotating on mandrel.

19. The wellbore servicing method of claim 14, wherein the axial position of the third recess is substantially centered between the first and second recesses.

20. The wellbore servicing method of claim 14, wherein the split rings comprise an outer circumferential ball race, the stabiliser elements comprise a mating inner circumferential ball race, and additionally comprising a plurality of balls disposed in the mating ball races, whereby the stabilizer elements are rotatable with respect to the central mandrel.

21. The wellbore servicing method of claim 14, wherein one of the first and second service elements comprises brushes.

22. The wellbore servicing method of claim 14, wherein the third service element comprises a junk basket.

23. The wellbore servicing method of claim 14, wherein the third service element comprises a magnet.

24. The wellbore servicing method of claim 14, additionally comprising the step of returning the well servicing tool to said well servicing tool's unreconfigured configuration after the reconfigured tool is moved out of the wellbore.

25. The wellbore servicing method of claim 14, wherein a service element comprises wellbore, contacting elements.

* * * * *